United States Patent

[11] 3,571,676

| [72] | Inventor | David D. Hottinger<br>South Milwaukee, Wis. |
|---|---|---|
| [21] | Appl. No. | 833,371 |
| [22] | Filed | June 16, 1969 |
| [45] | Patented | Mar. 23, 1971 |
| [73] | Assignee | McGraw-Edison Company<br>Elgin, Ill. |

[54] POWER CAPACITORS
8 Claims, 3 Drawing Figs.

[52] U.S. Cl............................................... 317/242,
317/243
[51] Int. Cl.............................................. H01g 1/08
[50] Field of Search.......................................... 317/242,
243

[56] References Cited
UNITED STATES PATENTS

| 2,075,891 | 4/1937 | Dublier................ | 317/243X |
| 3,098,956 | 7/1963 | Hammer................ | 317/243 |

FOREIGN PATENTS

| 1,394,213 | 2/1965 | France................ | 317/243 |
| 689,865 | 4/1953 | Great Britain........... | 317/243 |

*Primary Examiner*—E. A. Goldberg
*Attorney*—Richard C. Ruppin

ABSTRACT: An insulation arrangement for a high potential capacitor is provided in which insulation members are arranged and have shapes such that a high basic insulation level is maintained while at the same time flow of liquid dielectric coolant within the tank of the capacitor is not impeded by the insulation members. Also, the insulation members are such that additional liquid reservoir space is provided for cooling the capacitor.

PATENTED MAR 23 1971 3,571,676

POWER CAPACITORS

BACKGROUND OF THE INVENTION

This invention relates to power factor correction capacitors for electrical power systems.

Power factor correction capacitors are utilized to improve power factor, reduce line losses, and decrease voltage drop on electrical power transmission and distribution circuits. Conventionally, power factor correction capacitors are connected to a high voltage line either directly in shunt or in series-parallel groups with each group consisting of a number of capacitor units connected in parallel and with the groups connected in series from phase-to-phase or from phase-to-neutral of the transmission or distribution system. Tremendous increases in the use of electrical power have produced high load demands necessitating additional capacitive kilovar on distribution and transmission systems and, in order to meet the increasing requirement for capacitive kilovar at higher voltages, manufacturers of capacitors have continually increased the rating of individual-capacitor units.

An increase in kilovars at higher voltage ratings necessitates a corresponding increase in basic insulation level and improved cooling ability of the capacitors. There are several methods that may be utilized in obtaining increased insulation protection. These methods include increasing the overall thickness of the insulation used, grading the insulation with electrically floating coils, grading the insulation with electrically fixed coils or some combination of the foregoing. A disadvantage of increasing insulation protection is that the flow of the cooling medium used in the capacitor is thereby impeded. Another problem is that continuous sheets of foil commonly used for electrical grading are difficult to assemble within the insulation members of the capacitor.

It is an object of this invention to provide a high potential capacitor having an improved basic insulation level.

It is another object of this invention to provide a high potential capacitor having improved cooling abilities.

It is a further object of this invention to provide a high potential capacitor having an insulation arrangement providing a high basic insulation level while at the same time providing improved capacitor cooling abilities.

These and other objects and advantages of the instant invention will be apparent from the description of the preferred embodiment hereinbelow.

SUMMARY OF THE INVENTION

The objects of the invention are accomplished by providing a capacitor insulation arrangement and insulation member shapes which provide the necessary insulation and spacing between the capacitor pack and capacitor tank walls of the capacitor for a high basic insulation level. At the same time, the insulation members are shaped such that flow of liquid dielectric coolant within the capacitor tank is not impeded by the insulation members. Further, the insulation members are such that they provide additional liquid reservoirs to permit increasing the volume of dielectric liquid for cooling purposes.

DESCRIPTION OF THE PREFERRED EMBODIMENT

Figure 1:
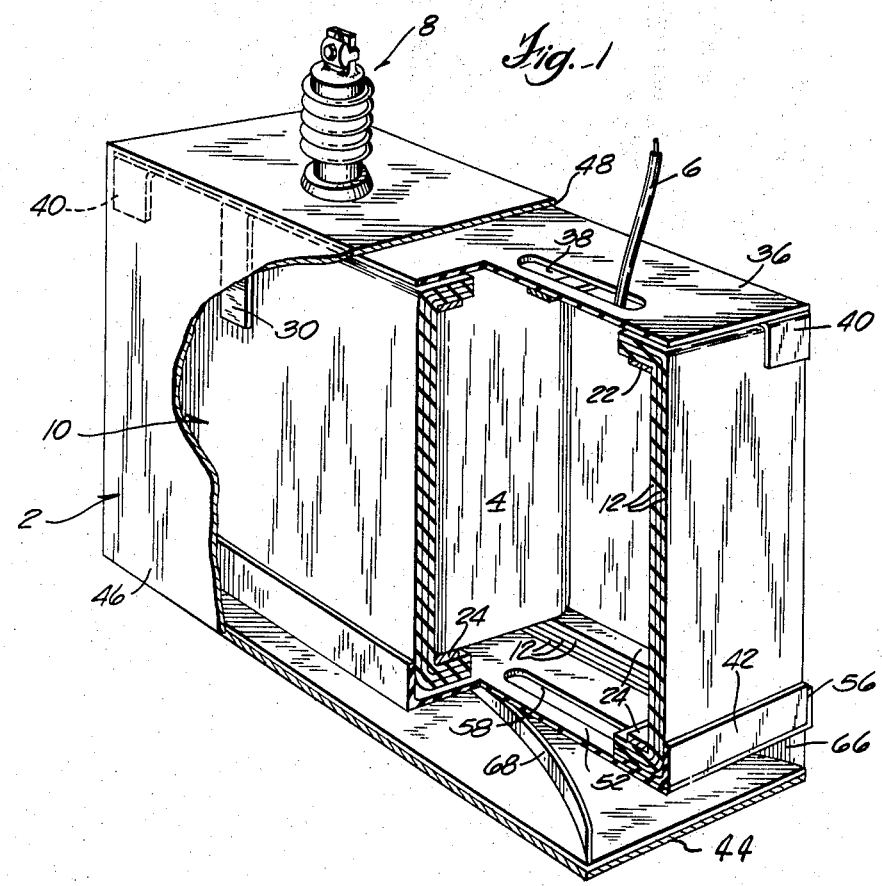
FIG. 1 shows a perspective view, partially broken away, of the capacitor and insulation of the invention.

Referring to the drawings, a high potential capacitor embodying the invention has a metallic tank 2 filled with a suitable dielectric insulating fluid such as chlorinated diphenyl and enclosing a capacitor pack 4 comprising a plurality of flattened capacitor sections 5. The sections 5 may be connected in any desired or parallel arrangement and are connected through resistors (not shown) and leads 6 to bushing terminals 8. The bushing terminals 8 are generally connected between two phases or between a phase and the neutral of an electrical power system (not shown). The construction and connection of capacitor sections such as packs 5 is well known in the art and will not be described in detail.

Figure 2:
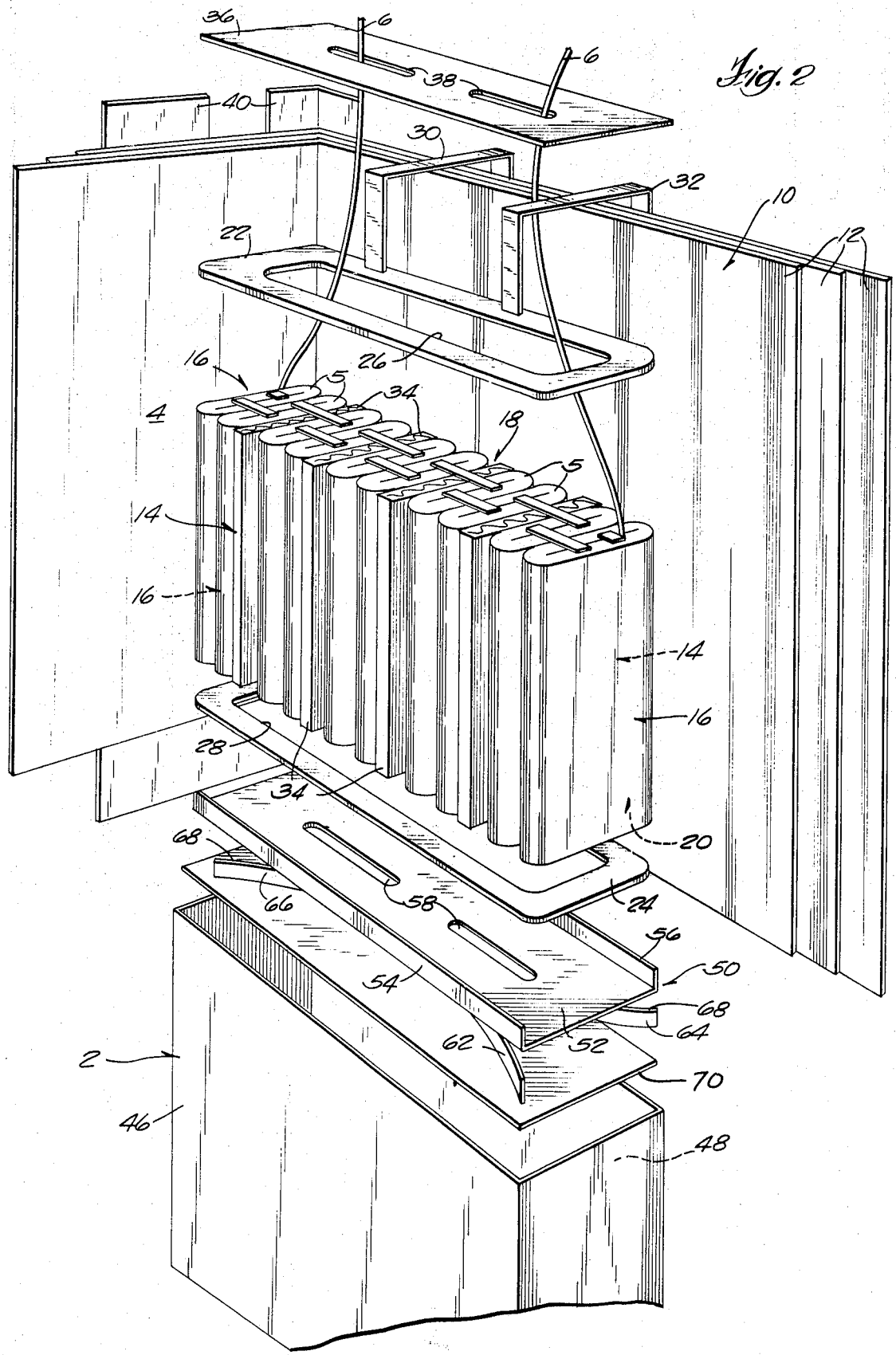
FIG. 2 shows an exploded view of the insulation members prior to assembly and positioning of the insulation members within the capacitor tank.

The insulation of the capacitor includes the major insulation envelope 10 which comprises a plurality of layers 12 of kraft paper surrounding the opposing sides 14 and 16 of the capacitor pack 4. As shown in FIG. 1, the layers 12 are folded over toward the upper and lower sides 18 and 20 of the capacitor pack 4 to provide insulation for the sides 18 and 20 and the edges and corners formed by the meeting of the sides 14, 16, 18 and 20. The top and bottom pack spacers 22 and 24 are respectively positioned against the top side 18 and the bottom side 20 of capacitor pack 4 to hold the folded over portions of the layers 12 away from the pack 4 so that the layers 12 do not interfere with circulation of liquid dielectric through the pack 4. The spacers 22 and 24 may be formed from layers of kraft paper and respectively have openings 22 and 24 which provide reservoir space for liquid dielectric coolant. Corrugated spacers 34 are positioned between some of the capacitor sections 5 to permit flow of the coolant between sections 5. The holddown straps 30 and 32 are provided to hold the layers 12 against the top pack spacer 22. A top insulation board 36, which may also be formed from layers of kraft paper, is placed over the folded insulation envelope 10, as shown in FIGS. 1 and 2, to provide additional insulation between the capacitor pack 4 and the metal tank 2. Note that the top insulation board 36 includes the openings 38 which permit flow of liquid coolant between the capacitor pack 4 and the surfaces of the tank 2 so that the interference of the top insulation board 36 with capacitor cooling is minimized.

Further insulation is provided at the highly stressed corners of the capacitor pack by the upper major insulation extensions 40 which are folded over the insulation layers 12 only at each of the upper corners of the envelope 10. Since the insulation extensions 40 are positioned only at the corners of the envelope 10, they present very little interference with the flow of liquid coolant between the interior surfaces of the tank 2 and envelope 10. Lower major insulation extensions 42 are also provided at the lower corners and edges of the envelope 10 for increasing the insulation level of the capacitor. The extensions 40 and 42 may be positioned within the layers 12 of envelope 10 or on the exterior of envelope 10, as shown in FIG. 1.

An insulation boot 50 having a U-shape is also provided for insulating the capacitor pack 4 from the tank 2. The insulation boot 50 includes a bottom wall 52 and two ridge walls 54 and 56 extending away from the bottom wall 44 of tank 2. The ridge walls 54 and 56 are respectively positioned between the sidewall 46 of tank 2 and the envelope 10 and the sidewall 48 of tank 2 and the envelope 10, as shown in FIG. 1. The insulation boot 50 is also provided with openings 58 through the bottom wall 52 to allow cooling fluid to circulate between the interior surfaces of the tank 2 and the capacitor pack 4.

Figure 3:
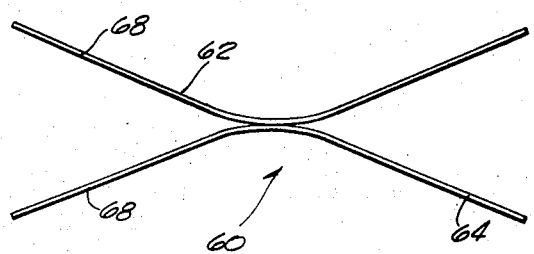
FIG. 3 shows a plan view of an insulation member.

A riser 60 is positioned between the bottom wall 44 of the tank 2 and the boot 50 for providing additional liquid coolant reservoir space. Note that the openings 58 in the boot 50 are positioned coaxially with the opening 28 in the bottom pack spacer 24 and also in communication with the reservoir formed by the riser 60 so that liquid coolant flowing between the walls of the tank 2 and envelope 10 can flow into the reservoir provided by riser 60, through the openings 58 and 28 and between the capacitor sections 5. The riser 60 is formed from one or more elongated strips of insulative material 62 and 64 as shown in FIG. 3. As shown in FIG. 1, the strips 62 and 64 have sides 66 of relatively greater width than edges 68 so that a maximum amount of reservoir space may be obtained with a minimum amount of insulative supporting material. Further insulation is provided between the capacitor pack 4 and the tank 2 by the bottom insulation board 70 which rests on the bottom wall 44 of the tank 2 and supports the riser 60.

As may be readily appreciated from the foregoing description, the addition of insulating members having the configurations shown increases the insulation level of capacitor while at the same time permitting necessary flow of coolant between the capacitor pack 4 and surfaces of the tank 2. Further, the insulation members have been positioned and shapes have been utilized such that increased coolant reservoir space has been provided to improve the cooling ability of the capacitor.

Since certain modifications which embody the invention may be made without departing from its scope, it is intended that all matters contained in the above description or shown in the drawings shall be interpreted as illustrative and not in the limiting sense.

I claim:

1. In an electrical capacitor having a metal casing, liquid dielectric within said casing, a plurality of electrically connected capacitor sections within said casing, said capacitor sections being also electrically connected to a high voltage source, the combination comprising:
   insulation means for insulating the capacitor sections from said casing; and
   an elongated substantially rigid insulative member positioned between a wall of said casing and said capacitor sections and having a width dimension and a thickness dimension small relative to said width dimension, said width dimension extending away from said casing wall.

2. The combination according to claim 1 wherein said insulative member comprises a plurality of strips of insulative material.

3. The combination according to claim 2 wherein said plurality of strips are joined together.

4. The combination according to claim 2 wherein said insulative member has four extended arms comprising an X-shape, said arms extending away from each other in directions parallel to said casing wall.

5. The combination according to claim 1 wherein said insulative member includes a side having said thickness dimension and said width dimension extends away from said casing wall independently of support from said side.

6. The combination according to claim 5 wherein said insulative member has a bend in a direction parallel to said casing wall, whereby said insulative member is supported with said width dimension extending away from the casing wall.

7. In an electrical capacitor having a metal casing, liquid dielectric within said casing, a plurality of electrically connected capacitor sections within said casing, said capacitor sections being also electrically connected to a high voltage source, the combination comprising:
   insulation means for insulating the capacitor sections from said casing; and
   an elongated substantially rigid insulative member including a plurality of strips of insulative material joined together, said insulative member being positioned between a wall of said casing and said capacitor sections and having a width dimension and a thickness dimension small relative to said width dimension, said width dimension extending away from said casing wall.

8. In an electrical capacitor having a metal casing, liquid dielectric within said casing, a capacitor pack within said casing including a plurality of capacitor sections electrically connected to a high voltage source, the combination wherein:
   said capacitor pack includes a plurality of adjoining sides spaced from said casing and a plurality of corners formed by the adjoining sides; and comprising insulation means for insulating the capacitor packs from said casing, said insulation means including a first sheet of insulative material surrounding said sides and a second sheet of insulative material positioned only at one of said corners and being folded in the shape of said one corner against said first sheet whereby additional insulation is provided at highly stressed corners of the capacitor pack without utilizing space required for the liquid dielectric within said casing; and
   a third sheet of insulative material having an opening therethrough and being positioned between a wall of said casing and said capacitor pack.